(12) United States Patent
Klein et al.

(10) Patent No.: US 10,670,175 B2
(45) Date of Patent: Jun. 2, 2020

(54) PLUG CONNECTOR FOR FLUID LINES, COMPRISING AN INNER ADAPTER SLEEVE

(71) Applicant: VOSS AUTOMOTIVE GMBH, Wipperfurth (DE)

(72) Inventors: Roland Klein, Wipperfurth (DE); Eugen Heinrichs, Bergneustadt (DE)

(73) Assignee: VOSS Automotive GmbH, Wipperfurth (DE)

( * ) Notice: Subject to any disclaimer, the term of this patent is extended or adjusted under 35 U.S.C. 154(b) by 648 days.

(21) Appl. No.: 15/315,321

(22) PCT Filed: Jun. 1, 2015

(86) PCT No.: PCT/EP2015/062178
§ 371 (c)(1),
(2) Date: Nov. 30, 2016

(87) PCT Pub. No.: WO2015/181396
PCT Pub. Date: Dec. 3, 2015

(65) Prior Publication Data
US 2017/0152980 A1 Jun. 1, 2017

(30) Foreign Application Priority Data

May 30, 2014 (DE) .......................... 10 2014 107 655
Apr. 1, 2015 (WO) .................. PCT/EP2015/057243

(51) Int. Cl.
*F16L 37/098* (2006.01)
*F16L 37/084* (2006.01)

(52) U.S. Cl.
CPC ......... *F16L 37/0985* (2013.01); *F16L 37/084* (2013.01)

(58) Field of Classification Search
CPC ... F16L 37/0985; F16L 37/101; F16L 37/096; F16L 37/098; F16L 37/0987; F16L 37/12; F16L 37/122; F16L 37/37; F16L 37/1235; F16L 37/133; F16L 37/252; F16L 37/084; F16L 37/086
USPC .............................. 285/314, 305, 319, 86, 39
See application file for complete search history.

(56) References Cited

U.S. PATENT DOCUMENTS

| | | | | |
|---|---|---|---|---|
| 5,607,190 A | * | 3/1997 | Exandier ............. | F16L 37/0985 285/308 |
| 6,349,978 B1 | * | 2/2002 | McFarland ......... | F16L 37/0985 285/319 |
| 6,467,816 B1 | * | 10/2002 | Huang ................ | F16L 37/0985 285/308 |

(Continued)

FOREIGN PATENT DOCUMENTS

| | | | |
|---|---|---|---|
| DE | 102011084988 A1 | 4/2013 | |
| EP | 0568075 A1 | 11/1993 | |
| EP | 2880349 B1 | * 3/2018 | .......... F16L 37/0985 |

*Primary Examiner* — Zachary T Dragicevich
*Assistant Examiner* — William S. Choi
(74) *Attorney, Agent, or Firm* — Eric J. Sosenko; Jonathan P. O'Brien; Honigman LLP

(57) ABSTRACT

A connector for connecting at least one fluid line with another fluid line or a power unit. The connector includes a housing, a mating connector and an adapter sleeve. The adapter sleeve includes positive-locking elements that retain the adapter sleeve engaged with the housing. The adapter sleeve further includes latching arms releasably retaining the mating connector in the adapter sleeve.

27 Claims, 14 Drawing Sheets

(56) References Cited

U.S. PATENT DOCUMENTS

| | | |
|---|---|---|
| 7,770,938 B2 | 8/2010 | Bauer |
| 7,850,472 B2 * | 12/2010 | Friedrich ............. H01R 13/506 439/256 |
| 2008/0246274 A1 | 10/2008 | Feger et al. |
| 2012/0080880 A1 * | 4/2012 | Nakamura .......... F16L 37/0982 285/317 |
| 2012/0326436 A1 | 12/2012 | Lechner et al. |
| 2014/0125051 A1 * | 5/2014 | Barthel ............... F16L 37/0985 285/33 |

* cited by examiner

PLUG CONNECTOR FOR FLUID LINES, COMPRISING AN INNER ADAPTER SLEEVE

CROSS-REFERENCE TO RELATED APPLICATIONS

This application is the U.S. national phase of International Application No. PCT/EP2015/062178 filed on Jun. 1, 2015, and claims priority to DE 10 2014 107 655.9, filed on May 30, 2014 and PCT/EP2015/057243, filed on Apr. 1, 2015, the disclosures of which are incorporated in their entirety by reference herein.

TECHNICAL FIELD

The invention relates to a plug connector.

BACKGROUND

A plug connector is known from DE 10 2011 084 988.

Known from DE 10 2011 084 988, the positive locking means at the free end of the latching arms are formed on the outside thereof. The locking cams are also arranged on these latching arms, on the underside thereof, the locking cams being inside the sleeve section. This arrangement and design of the positive locking elements and the locking cams requires, on the one hand, a relatively elongated construction of the sleeve section, and in addition, there is a relatively large cutout in the wall of the sleeve section, so that the latching arms are unprotected, and furthermore, dirt can easily penetrate into the sleeve section. In addition, the connecting unit comprising connector and mating connector known from this publication also has additional holding elements in order to ensure anti-rotation protection.

Also known from DE 10 2006 013 899 and EP 0 568 075 are connectors in which the resilient holding means in the form of latching arms are an integral part of the housing of the connector. Since the housing is integrally formed, it is necessary to use a material for the entire housing that allows a resilience of the latching arms or latching means. Particularly when there are requirements relating to low flammability of components, additives may be required that lead to an embrittlement of the plastic housing of the connector, so that the necessary elasticity of the elastic locking means is no longer guaranteed. Furthermore, it is often necessary to use a metal housing, which also makes it difficult to realize elastic locking means. When there is bundling of cables, for example in vehicle construction, space is often very limited, so the housings of the cable connectors can have immediate contact with each other, but this can also result in damage to and deterioration of the elastic locking arms.

SUMMARY

The aim of the invention is to provide a connector, on the basis of a connector of the type described above, which independently of the housing material, and also with restricted available installation space, guarantees full elasticity and perfect functioning of the latching means, has a compact design, and allows a protected arrangement of the latching arms.

According to the principles of the invention, the locking means are not part of the housing, but rather the latching means are formed on the separate part of the adapter sleeve, which is inserted into the housing. In that way, different materials can be used for the housing and the adapter sleeve. What is more, the adapter sleeve sits substantially circumferentially protected in the casing, so its functioning cannot be substantially impaired by adjacent other housings. Because the positive-locking elements that comprise the locking tongues are formed on the outer periphery of the adapter sleeve between the locking arms, said locking tongues being directed against the direction of insertion of the adapter sleeve and extending obliquely at an acute angle to the longitudinal center axis and engaging in the inserted state in a positive-locking manner in recesses in the peripheral wall of the sleeve portion, it is possible to make the adapter sleeve relatively short and compact. In addition, the inventive positive-locking elements provide both axial attachment and in particular circumferential attachment of the adapter sleeve in the sleeve portion. Due to the positive locking in the axial direction, the adapter sleeve cannot be dislodged by axial forces, and due to inventive positive locking in the circumferential direction, rotation of the adapter sleeve is also avoided.

Inventively, it can be an advantage if the adapter sleeve has an annular collar extending around the circumference of its through-opening on its rear opening rim seen in the direction of insertion, said annular collar being arranged, when the adapter sleeve is in the inserted state, outside the sleeve section, wherein the locking cams also extend outside the sleeve section. Inventively, it is also an advantage if locking arms are offset by 180° relative to one another on the adapter housing, and if at the free ends of the latching arms there are actuating extensions projecting radially outward with respect to the longitudinal center axis. Here, it is advantageous if there are, in the region of the actuating extensions, open-ended guide grooves extending along the annular collar tangential to the through-opening of the adapter sleeve, the annular collar being interrupted by the actuating extensions, and each of the actuating extensions having an extension angled counter to the direction of insertion that extends, parallel to the longitudinal central axis, out of the respective guide groove, so that between the extensions and the guide grooves, an insertion opening suitable for inserting a release tool is formed. This inventive design allows release of the inserted connector by means of a release tool, in particular a bifurcated release tool, the fork prongs being inserted through the insertion opening, and by means of a displacement of the release tool vertical to the longitudinal axis, the locking arms can be disengaged with their locking cams from a locking groove of the mating connector.

Alternatively, it can be advantageous if the annular collar is separated from the adapter sleeve by circumferential gap sections between its locking arms, and the annular collar surrounds the latching arms in the region of the locking cams on their outer side and is connected to them in the region of the locking cams and the annular collar has deformation sections centrally between the locking arms, said deformation sections being deformable under a force directed radially toward the longitudinal central axis, causing a radially outward spreading of the locking arms such that the locking cams assume their release position. In this way, manual releasability of the inserted mating connector is made possible.

It is in particular advantageous if the thickness of the latching arms is less than the wall thickness of the adapter sleeve, so that between an outer periphery of the wall of the adapter sleeve and the latching arms, a stepped surface is formed, which extends radially in the direction of the longitudinal central axis. Here the radial height of the stepped surface and the length of the latch arms within the sleeve sections is dimensioned such that a radially outwardly directed spring path is provided such that a radial distance between the radially outwardly spread locking cams is greater/equal to an internal diameter of the adapter sleeve and/or greater/equal to the outer diameter of the plug shank of the mating connector.

Furthermore, it is advantageous if the outer diameter of the annular collar is equal to the outer diameter of the sleeve section. In particular, it is advantageous if the radial distance of the angled projections on their outer surfaces is equal to the outer diameter of the sleeve portion. Furthermore it can be advantageous if an outer diameter of the annular collar in the region of the locking cams is equal to the outer diameter of the sleeve section.

Due to the inventive design and arrangement, the latching arms can be bent outwardly apart in the region of the locking cam by means of the inserted plug connector, so that the locking arms, with the angled projections or the annular collar, project radially during the insertion process, in the region of the locking cams, against the outer circumference of the sleeve section, which provides a means of checking insertion, because they do not spring back until they have engaged in the latching groove of the plug shank of the mating connector, and it is thus shown that the insertion process is finished.

Furthermore, it is inventively advantageous if a peripheral seal is arranged in front of the through-opening in the sleeve section in the direction of insertion, in order to seal a circumferential gap between an inner wall and the sleeve section and the plug shank of a mating connector. Here it is advantageous if an annular shoulder to engage the peripheral seal is formed in the sleeve section at the transition of the section of the sleeve section with a widened diameter to the through-channel, in order to engage the peripheral seal, and the peripheral seal is crimped between the annular shoulder and a front end surface of the adapter sleeve. With this inventive arrangement of the peripheral seal, undercuts do not have to be made in either the connector or the mating connector in order to achieve crimping of the peripheral seal. In addition, the peripheral seal is protected in the interior of the sleeve section.

Furthermore, it may also be inventively advantageous if the section of the housing opposite the sleeve section is formed as a connecting pin, the connecting pin having a circumferential seal in a circumferential groove in the region of its free end, and in the region opposite the free end of the connecting pin, a plurality of latching webs extending in the direction of the free end, parallel to the longitudinal central axis of the connecting pin, which are evenly spaced on the circumference of the connecting pin. Here, inventively, there are preferably two diametrically opposite latching webs. At their free ends, the latching webs have locking catches directed radially inward in relation to the longitudinal central axis of the connecting pin. Here it is inventively also an advantage that there is a guide gap formed between the latching webs and the connecting pin, into which a connecting sleeve of a connector can be slid, said connecting sleeve having an inner through-bore into which the connecting pin is guided, and wherein, at the free end of the connecting sleeve, on its outer periphery, there is an annular shoulder that projects radially outward in relation to the longitudinal central axis, said annular shoulder having approach ramps that correspond to the locking projections of the locking webs, so that the connecting sleeve can be slid on, during which the latching webs are spread radially outward. This inventive design of the connecting pin and the connecting sleeve enables an axial displacement of these elements relative to each other in the connected state. By means of this design, the crash safety of an inventive connector is substantially increased, because this inventive design enables, for example, a maximum length compensation of 50 mm to 60, preferably 20 mm of travel.

Furthermore the present invention relates to a mating connector for inserting an inventive connector, wherein the mating connector comprises a plug shank and a recess formed in the insertion direction behind the plug-shaft locking groove. Advantageously, the plug shank is dimensioned such that in the inserted state, its free end projects from the adapter sleeve and terminates in the through-channel of the housing of the connector. The plug shank has an outer diameter that is greater than a radial distance of the locking cams of the spring arms. Inventively, it can be an advantage if the latching groove has an axial extension in the direction of insertion such that there is an axial displacement path by a certain length of the connector shaft in the adapter sleeve in the connected state, wherein the length of the connector shaft between the locking groove and its free end is dimensioned such that the connector shaft is extended by the length of the axial displacement path, so that that, in any position it projects with its free end out of the adapter sleeve and terminates in the through-channel of the housing. This inventive design enables a length adjustment, for example, by a distance of 5 mm.

The present invention also comprises a plug-in connector comprising an inventive connector and an inventive mating connector.

The inventive connector or mating connector or the inventive plug-in connector is used particularly in line systems for battery cooling systems, fuel lines, cooling-water lines, and in tank de-aeration lines for Adblue tanks, for example. It is suitable particularly for a pressure range of up to 5 bar, preferably 2 bar. In addition, the inventive connector is characterized by a very compact construction, and the inventive mating connector has a very simple design.

Advantageous embodiments of the invention are shown in the drawings. The invention is explained in more detail below with reference to the exemplary embodiments in the attached drawings.

BRIEF DESCRIPTION OF THE DRAWINGS

In the different figures of the drawing, the same parts are always provided with the same reference numbers.

DETAILED DESCRIPTION

With regard to the following description, it is claimed that the invention is not limited to the embodiments or to all or several features of described combinations of features, but rather that each individual partial feature of the/each exemplary embodiment, also in isolation from all other partial features described in connection with it, as such and also in combination with any features of another exemplary embodiment, is significant for the object of the invention.

Figure 1:
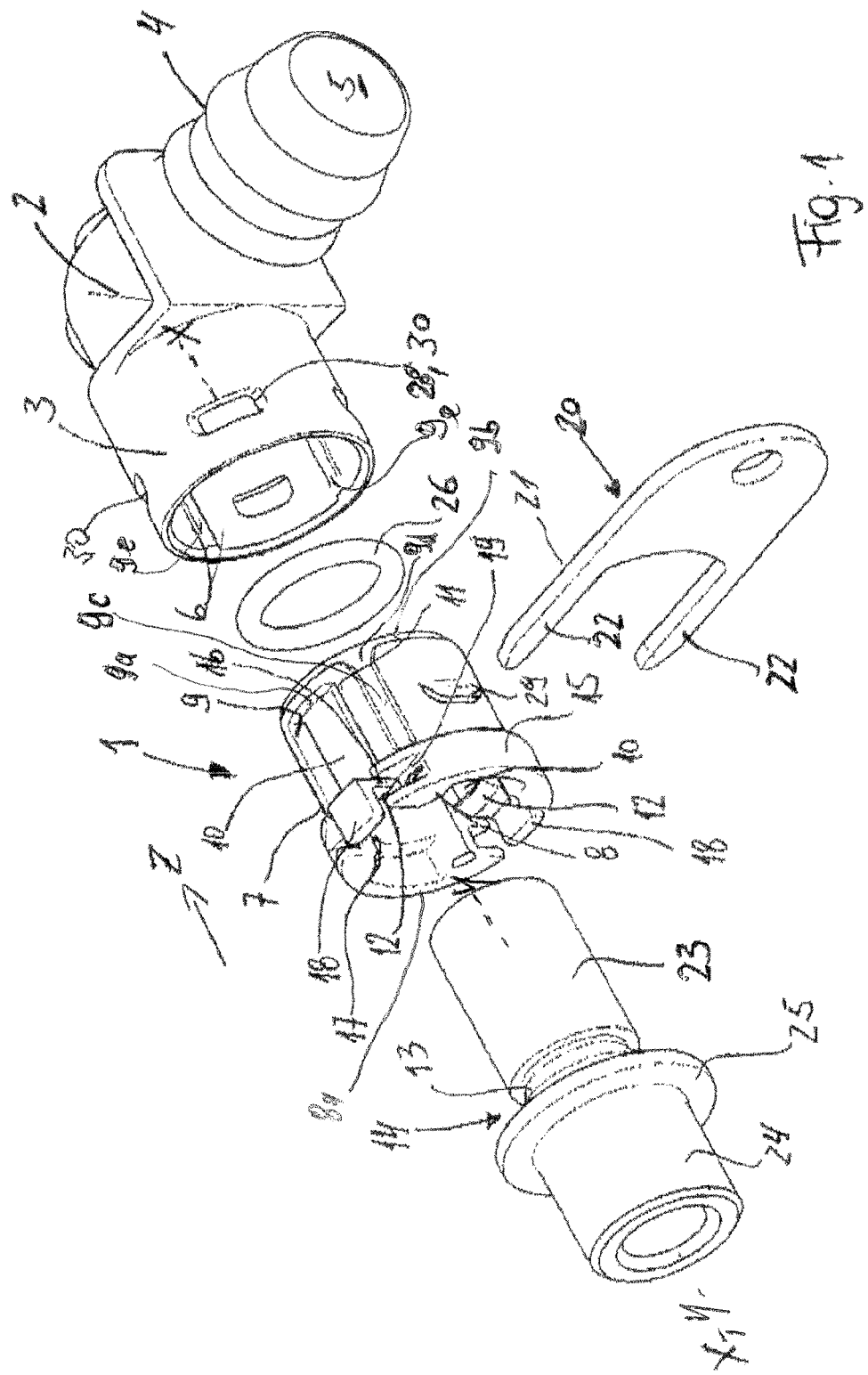
FIG. 1 an exploded perspective view of a first inventive embodiment of a connector and a mating connector, FIG. 2 a front view of an inventive adapter sleeve according to FIG. 1, FIG. 3 a section along the section line in FIG. 2
Figure 2:
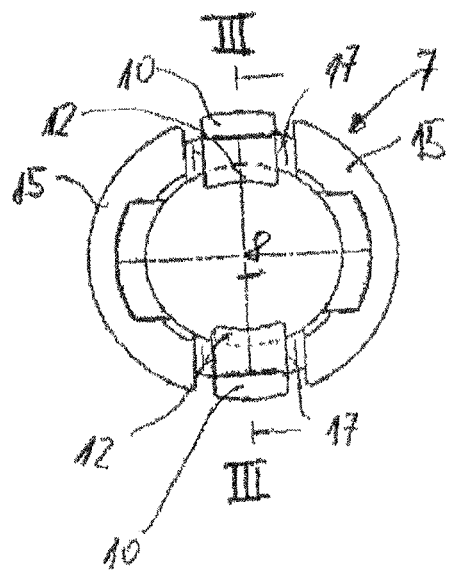
Figure 3:
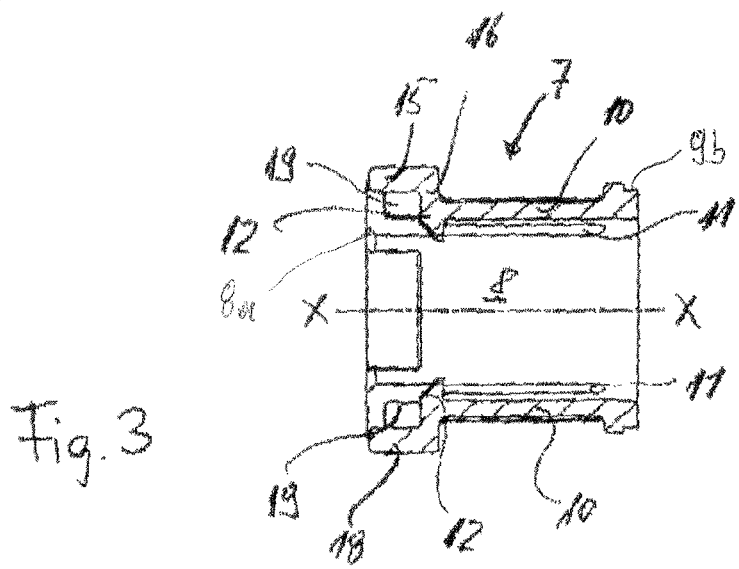
Figure 4:
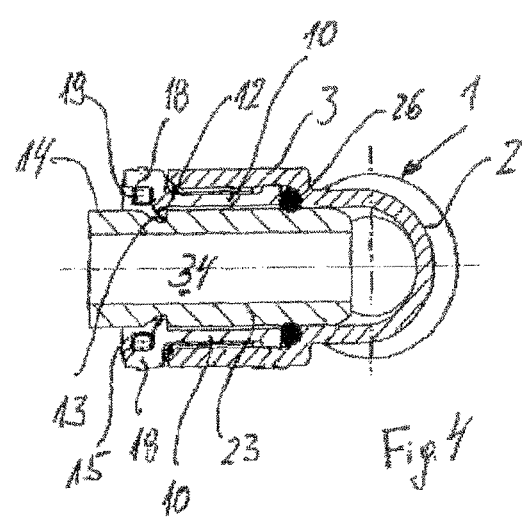
FIG. 4 a longitudinal section through an inventive connector according to FIG. 1 in the plugged-in state of the mating connector, FIG. 5 an exploded perspective presentation of an additional embodiment of an inventive connector with a mating connector, FIG. 6 a front view of an inventive adapter sleeve according to FIG. 5, FIG. 7 a section along the section line VII-VII in FIG. 6, FIG. 8 a longitudinal section through an inventive embodiment according to FIG. 5 in the plugged-in state of the mating connector, FIG. 9 a section according to FIG. 8 with an additional embodiment of an inventive connector and mating connector, FIG. 10 a side perspective view of an additional embodiment of an inventive connector and an associated terminal connector, FIG. 11 a longitudinal section through the embodiment according to FIG. 10.

As shown in FIG. 1, an inventive connector 1 has a housing 2 with a sleeve section 3 on its end. On its other end, the housing 2 has a plug-in section 4, for example for inserting a fluid line or a line connector. This plug-in section 4 can however also be designed as a receiving section for a fluid line. Alternatively, the housing 2 can also be connected at the other end to a unit.

The plug-in connection 1 can also be designed as a right-angle plug connector, as shown in FIG. 1. Alternatively, however, the connector 1 may not be angled between the sleeve section 3 and the opposite end 4, or any angles could be formed between the parts 1 and 4. A T-shaped or Y-shaped connector is also possible.

The housing 2 has a through-channel 5. The through channel has a channel section 6 with an enlarged diameter in the region of the sleeve section 3.

In the sleeve section 3 with the channel section 6 of the housing 2 that has an enlarged diameter, an adapter sleeve 7 is inserted. This adapter sleeve 7 has a through opening 8. In addition, the adapter sleeve 7 has a sleeve wall 9 surrounding the through opening 8. In two diametrically opposite sections in particular, latching means are formed in the sleeve wall 9. These latching means preferably comprise two latching arms 10 that are radially elastic in relation to a longitudinal central axis X-X of the adapter sleeve 7, said latching arms being arranged axially offset from one another by 180°. These latching arms 10 extend parallel to the longitudinal central axis X-X and are separated on their longitudinal sides from the sleeve wall 9 by slot-shaped cutouts 11. The latching arms 10 are attached to the sleeve wall 9 at their front end in relation to the direction of insertion Z of the adapter sleeve 7. Here the latching arms 10 preferably have a smaller thickness than the wall thickness of the sleeve wall 9, so that between the outer circumference of the sleeve wall 9 and the latching arms 10, a stepped surface 9a is formed extending in the direction of the longitudinal central axis X-X.

As can also be seen in FIG. 1, it can be advantageous if an annular step 9b is formed at the front end in the direction of insertion Z of the adapter sleeve 7 by means of a reduction in diameter. Starting from this annular step 9b, guide grooves 9c running parallel to the longitudinal central axis X-X extend on the circumference of the adapter sleeve 7. The groove base of said grooves lies on the same radius around the longitudinal central axis X-X as the circumference of the annular step 9b. The guide grooves 9c each have an insertion opening 9d that widens like a funnel in the direction of insertion Z. The guide grooves 9c serve the purpose of guiding guide ribs 9e formed in the interior of the channel section on its inner wall during insertion of the adapter sleeve 7 into the channel section 6 whereby the adapter sleeve 7 is aligned such that the guide ribs 9e are guided into the guide grooves 9c. This results in a correct positioning of the adapter sleeve 7 in the channel section 6.

The latching arms 10 have, for example, on their free ends, locking cams 1 that are aligned radially in the direction of the longitudinal central axis X-X. These locking cams 12, in the state in which the adapter sleeve is inserted in the through-opening 8, latch into a locking groove 13 of a mating connector 14. These locking cams 12 lie outside the sleeve section 3 in the inserted state of the adapter sleeve 7.

It can also be useful if the adapter sleeve 7 has an annular collar 15 on the circumference of its through opening 8, i.e. in the rearward opening region, seen in the direction of insertion. This annular collar 15 extends radially outward opposite the sleeve wall 9 so that its outside diameter is greater than the outer diameter of the sleeve wall 9 and is advantageously equal to the outer diameter of the sleeve section 3. The annular collar 15 forms a kind of insertion-limiting means for the adapter sleeve 7, the annular collar being outside the sleeve section 3 in the inserted state of the adapter sleeve 7.

Radially outwardly protruding, web-like actuating extensions 16 are formed on the latching arms 10, in particular on their free ends in relation to the longitudinal central axis X-X. These actuating extensions 16 extend through radially extending cutouts 17, to be precise in relation to the longitudinal central axis X-X, so that the annular collar 15 is interrupted by these cutouts 17. On their free ends, the actuating extensions 16 have extensions 18 that are angled against the direction of insertion Z, said extensions running parallel to the longitudinal axis X-X. These extensions 18 advantageously extend flush with the outer periphery of the annular collar 15, so that the radial distance between the angled extensions 18 on their outer surface is the same as the outer diameter of the annular collar 15. In the region of the extensions 18, guide grooves 19, U-shaped in cross-section, outwardly open-edged in radial direction, are formed in the annular collar 15 tangentially to the through-opening 8 of the adapter sleeve 7. The extensions 18 and the guide grooves 19 form an insertion-opening for a release tool 20. This release tool 20 has, for example, a fork-shaped end section 21 with two diametrically opposed fork prongs 22. The distance between the fork prongs corresponds to the radial distance between the guide grooves 19 in the region of their bottom sections. The width of the fork prongs 22 is smaller than/equal to the width of the guide grooves 19. On their free ends, the fork prongs 22 have a height that is smaller than the radial distance between the angled extensions 18 and the bottom sections of the guide grooves 19.

From their free ends, the height of the fork prongs 22 continuously increases to a final height dimension. This final height dimension is such that by inserting the fork prongs 22 vertically to the longitudinal central axis X-X into the insertion openings formed by the extensions 18 and the guide grooves 19, the latching arms 10 are elastically bent radially outward, to be precise such that the radial distance between their locking cams 12 is greater than the outer diameter of a plug shank 23 of the mating connector 14. If the plug shank 23, in the plugged-in state of the mating connector 14, is inside the adapter sleeve 7 when the locking cams 12 are engaged in the locking groove 13 of the mating connector 14, inserting the release tool 20 into the guide grooves 19 can release the engaged position of the locking cams 12, and the plug shank 23 can be pulled out of the adapter sleeve 7.

The mating connector 14 has the plug shank 23, which has a circular cross-section vertical to its central axis Y-Y. The outer diameter of the plug shank 23 is greater than a radial distance between the locking cams 12, so that the latching arms 10 are bent radially outward when the plug shank 23 is inserted. On its forward end, in the direction of insertion Z, the plug shank 23 has the circumferential locking groove 13. The locking groove 13 has a front contact surface extending in the direction of insertion, vertical to the central axis Y-Y, said contact surface interacting with a contact surface of the locking cam 12 which also extends vertically to the longitudinal central axis X-X such that a positive-locking is provided in the axial direction in the inserted state, so that an unintentional release of the plug-in pin or the plug shank 23 cannot take place under tensile forces. On the end of the mating connector 14 opposite the plug shank 23, a connecting section 24 for connecting a fluid line or a unit is provided. Between the connecting section 24 and the locking groove 13 of the mating connector 14, an annular ring 25 is advantageously formed, which can function as a stopper.

The length of the plug shank 23 is dimensioned such that the shaft, in the inserted state in the adapter sleeve 7, projects with its free end out of the adapter sleeve 7 and extends into the through-channel 5 of the housing 2.

It is also inventively provided that within the sleeve section 3, a circumferential seal 26 is provided in front of the adapter sleeve 7 in the direction of extension Z. This circumferential seal 26 seals the circumferential gap between the plug shank 23 in its inserted state and the inner wall of the sleeve section 3. The circumferential seal 26 is preferably formed as an O-ring seal and is crimped within the sleeve section 3 between an inner annular shoulder 27 of the sleeve section 3 at the transition of the sleeve section 3 and a front end surface of the adapter sleeve 7. Due to this inventive design, there is no need for the formation of a receiving groove for the circumferential seal 26 so that in manufacturing, the formation of undercuts is not required. In addition, in the assembled state of the adapter sleeve 7, the circumferential seal 26 arranged in a protected manner inside the sleeve section 3. The inner diameter of the through-channel 5 of the housing 2 and the inner diameter of the through-opening 8 of the adapter sleeve 7 are adapted to the outer diameter of the plug shank 23 of the mating connector 14. Advantageously, the inner diameter of the through-channel 5 and the through-opening 8 is the same. Due to an elastic deformation of the sealing ring 26, which is caused by the insertion of the plug shank 23, there is, on the one hand, a seal to the exterior, and on the other hand a attachment of the plug shank 23 in the adapter sleeve 7 or in the sleeve section 3 due to the deforming tension produced inside the O-ring seal.

Figure 14:
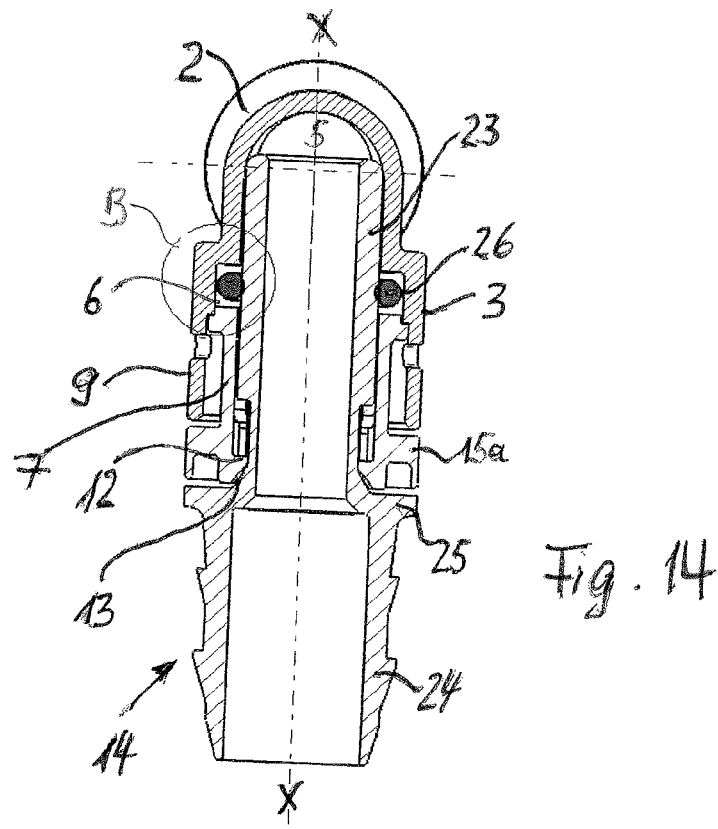
Figure 14A:
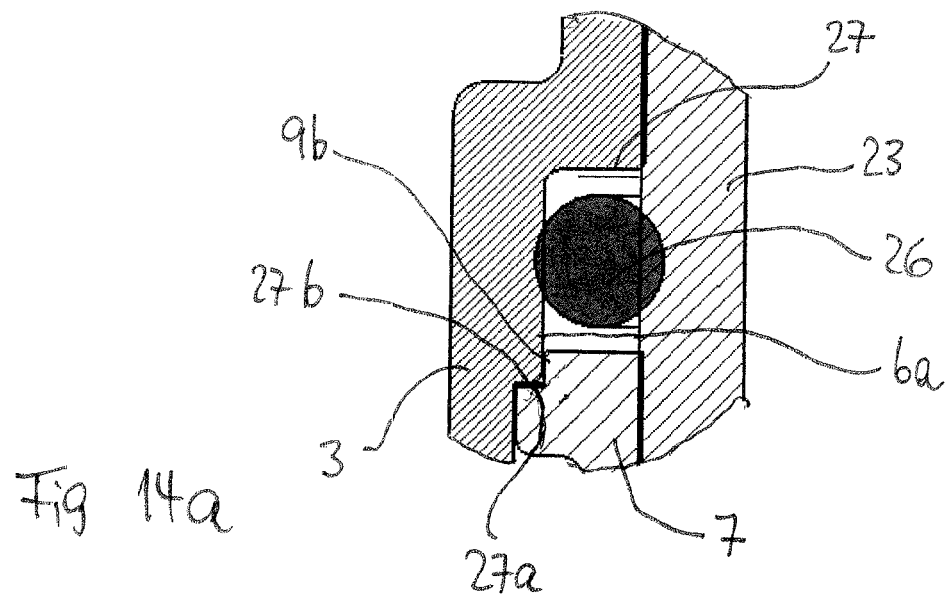

The annular step 9b of the adapter sleeve 7 has a circumferential contact surface 27a extending radially to the longitudinal central axis X-X. As shown in FIGS. 14 and 14a, the channel section 6 in particular has an annular contact surface 27a in the sense of a diameter enlargement which is arranged such that the circumferential seal 26 extends between the annular shoulder 27 and the stop surface 27b. In the inserted state, the adapter sleeve 7 abuts with its contact surface 27a on the stop surface 27b, and the adapter sleeve 7 protrudes with its annular step 9b into the section 6a of the channel-section 6 which is sealed by the circumferential seal 26.

Due to the projecting design, there is a geometric closure of the receiver for the circumferential seal 26, a restriction of the intermate path during assembly of the adapter sleeve 7, absorption or transfer of the expansion force, as well as maintenance of a gap width between the sleeve section 3 of the housing 2 and the adapter sleeve 7.

According to the invention, the adapter sleeve 7 is attached in a positive-locking manner inside the sleeve section 3 in axial and preferably also in the circumferential direction by means of positive-locking elements 28. These positive-locking elements 28 comprise radially elastic, deformable latching tongues 29, directed outward against the direction of insertion Z of the adapter sleeve 7, formed on the circumference of the adapter sleeve 7 between the latching arms 10.

The latching tongues 29 extend obliquely outwards at an acute angle to the longitudinal central axis X-X in the sense of a diameter enlargement. The latching tongues 29 fit the recesses 30 in the circumferential wall of the sleeve section 3. In the inserted state of the adapter sleeve 7 in the sleeve section 3, the latching tongues 29 engage in a positive-locking manner in the recesses 30. The recesses 30 are advantageously formed as apertures in the wall of the sleeve section 3. The latching tongues 29 are, in particular, dimensioned such that their free ends, in the inserted state, do not project out of the apertures. At their free ends, the latching tongues 29 point vertically toward end-faces extending vertically to the longitudinal central axis X-X of the adapter sleeve 7, and the recesses 30 have contact surfaces opposite the end-faces of the latching tongues 29, said contact surfaces also extending vertically to the longitudinal central axis X-X. In the inserted state, this design of the opposite surfaces causes a positive-locking connection in the axial direction. Advantageously, the latching tongues 29 and the recesses 30 are adapted to each other in such manner that in the inserted state, rotation of the adapter sleeve 7 is not possible.

In the FIGS. 5 to 10, an additional embodiment of an inventive connector 1 is shown wherein the same parts and/or functionally equivalent parts of the connector 1 shown in the FIGS. 1 to 4 are designated with the same reference numbers. The difference between the connector in the FIGS. 1 to 4 and the connector 1 according to the FIGS. 5 to 10 is found in the form of the annular collar. The annular collar 15a according to the FIGS. 5 to 10 is circumferentially separated from the adapter sleeve 7 by circumferential gap sections 32 between the latching arms 10. In the region of the locking cams 12 of the latching arms 10, the annular collar 15a is connected to the latching arms 10 on their outer side. Consequently the annular ring 15a encloses the adapter sleeve 7 in the region of the free ends of the latching arms 10. Inventively, it is advantageous if the annular collar 15a has, in the middle between the latching arms 10, two deformation sections 33 diametrically opposite to one another. In the region of these deformation sections 33, the annular collar 15*a* can be radially inwardly deformed by an external force applied radially to the longitudinal central axis X-X in such manner that the latching arms 10 are spread radially outward in such a way that their locking cams 12 are disengaged from the locking groove 13 of the plug shank 23 of the inserted mating connector 14. In this way, manual releasability of the mating connector 14 from the connector 1 is possible. The outer diameter of the annular collar 15*a* in the region of the locking cams 12 is, in particular, equal to the outer diameter of the sleeve section 3. Advantageously, the deformation sections 33 are formed by bulges of the annular collar 15*a* that are directed radially outward in relation to the longitudinal central axis X-X.

The adapter sleeve 7 in the embodiment shown is inventively assembled in that first the circumferential seal 26 is placed in the sleeve section 3. Then the adapter sleeve 7 is inserted into the sleeve section 3 until its positive-locking elements 28, i.e. the latching tongues 29, engage with the recesses 30. The mating connector 14 is inserted into the inventive connector 1 assembled in this way, and in the inserted state, the locking cams 12 of the latching arms 10 engage with the locking groove 13 of the mating connector 14.

Figure 5:
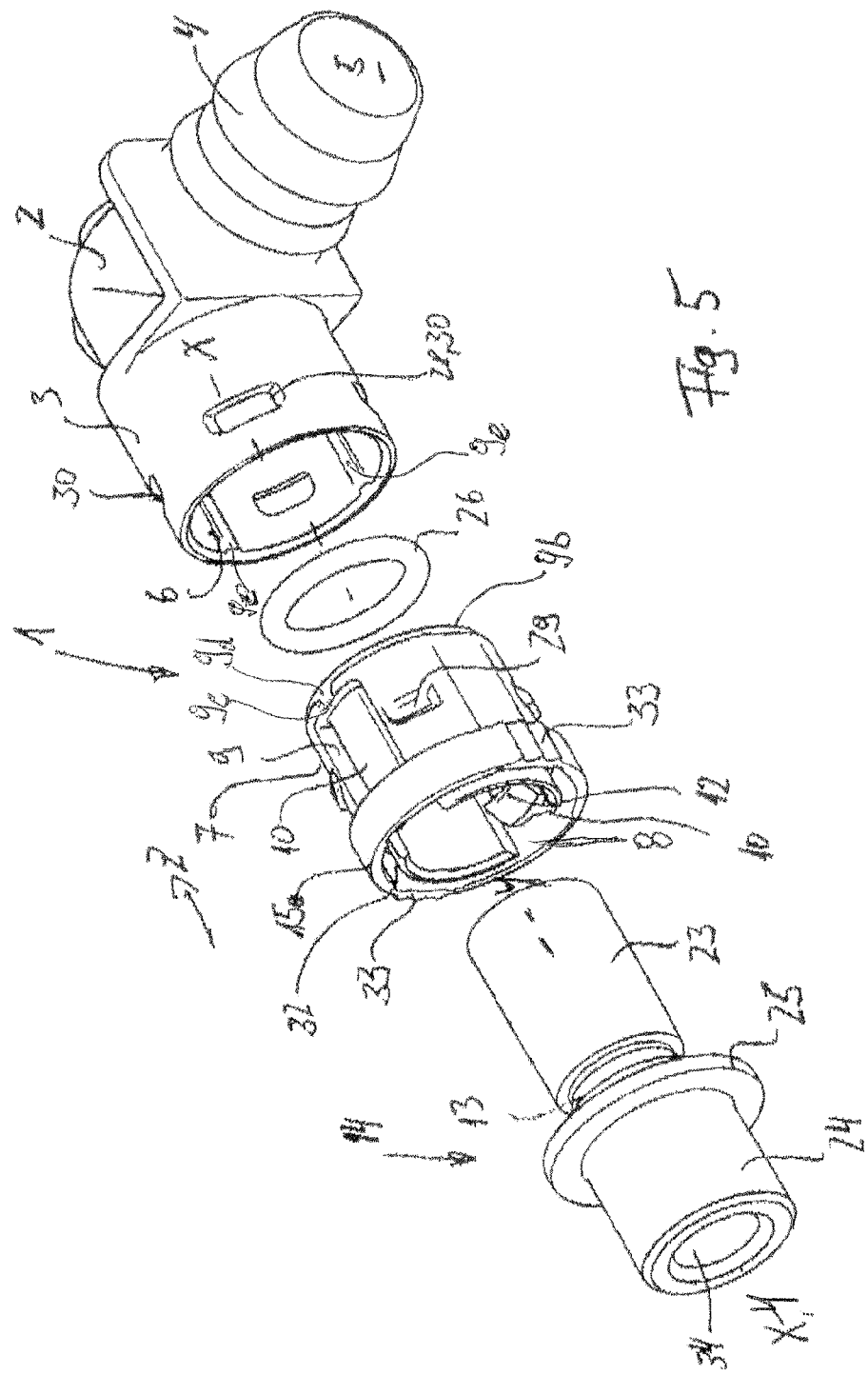
Figure 6:
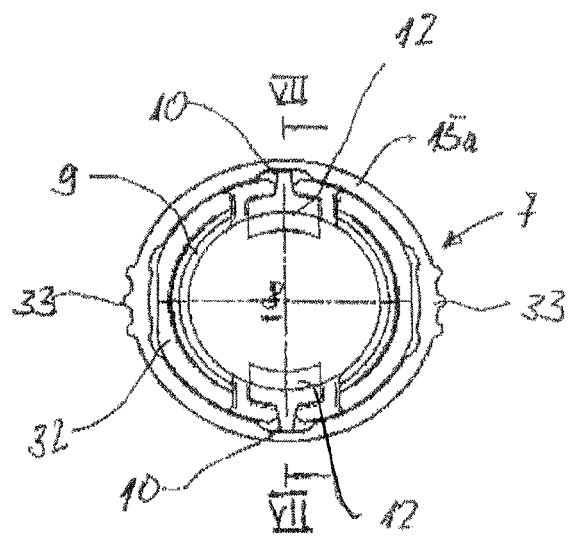
Figure 7:
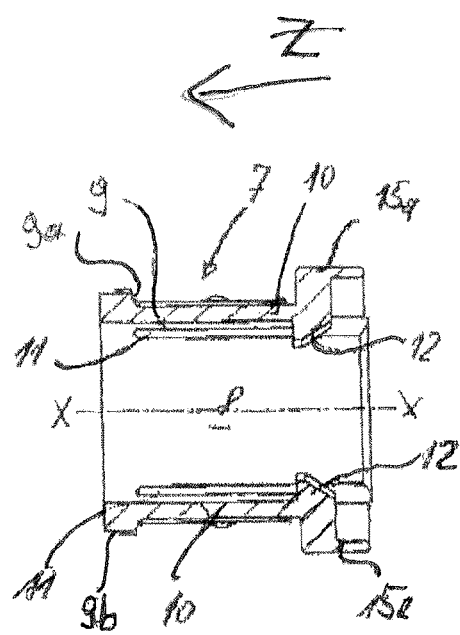
Figure 8:
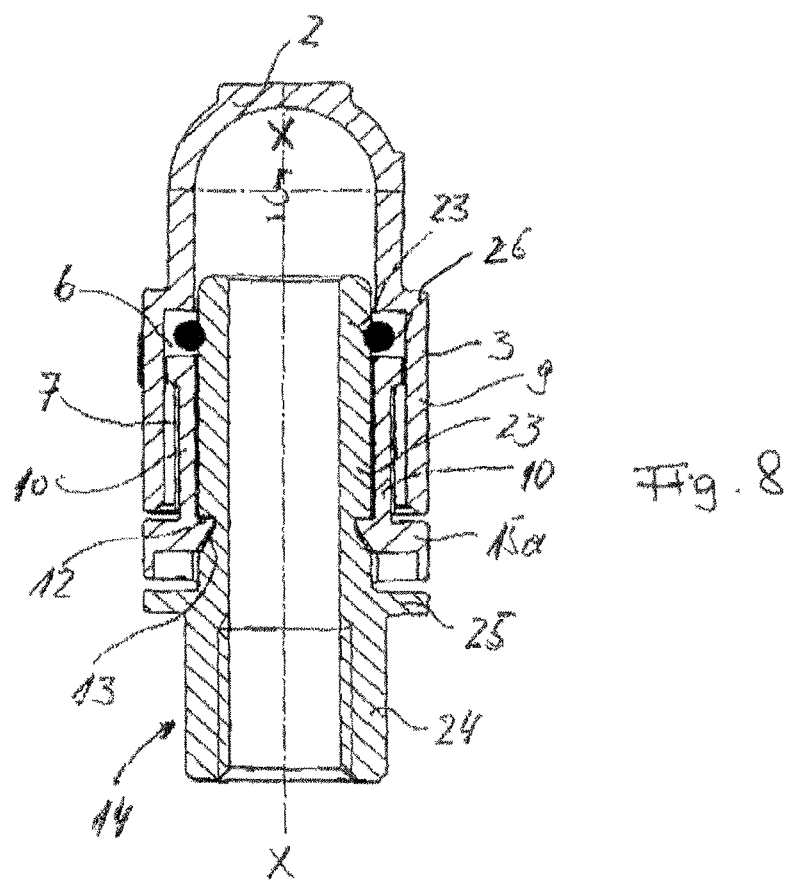

The connecting section 24 of the mating connector 14 can be formed as a ferrule for inserting or threading in a fluid connection or an additional connector part, see FIGS. 1 and 5. Alternatively, the connecting section 24 can also be formed as a connection pin for plugging on a fluid line, see for example FIG. 9.

A fluid channel 34 extends through the mating connector 14, said channel advantageously having an inner diameter that corresponds to the inner diameter of the through-channel 5 of the housing 2.

Figure 9:
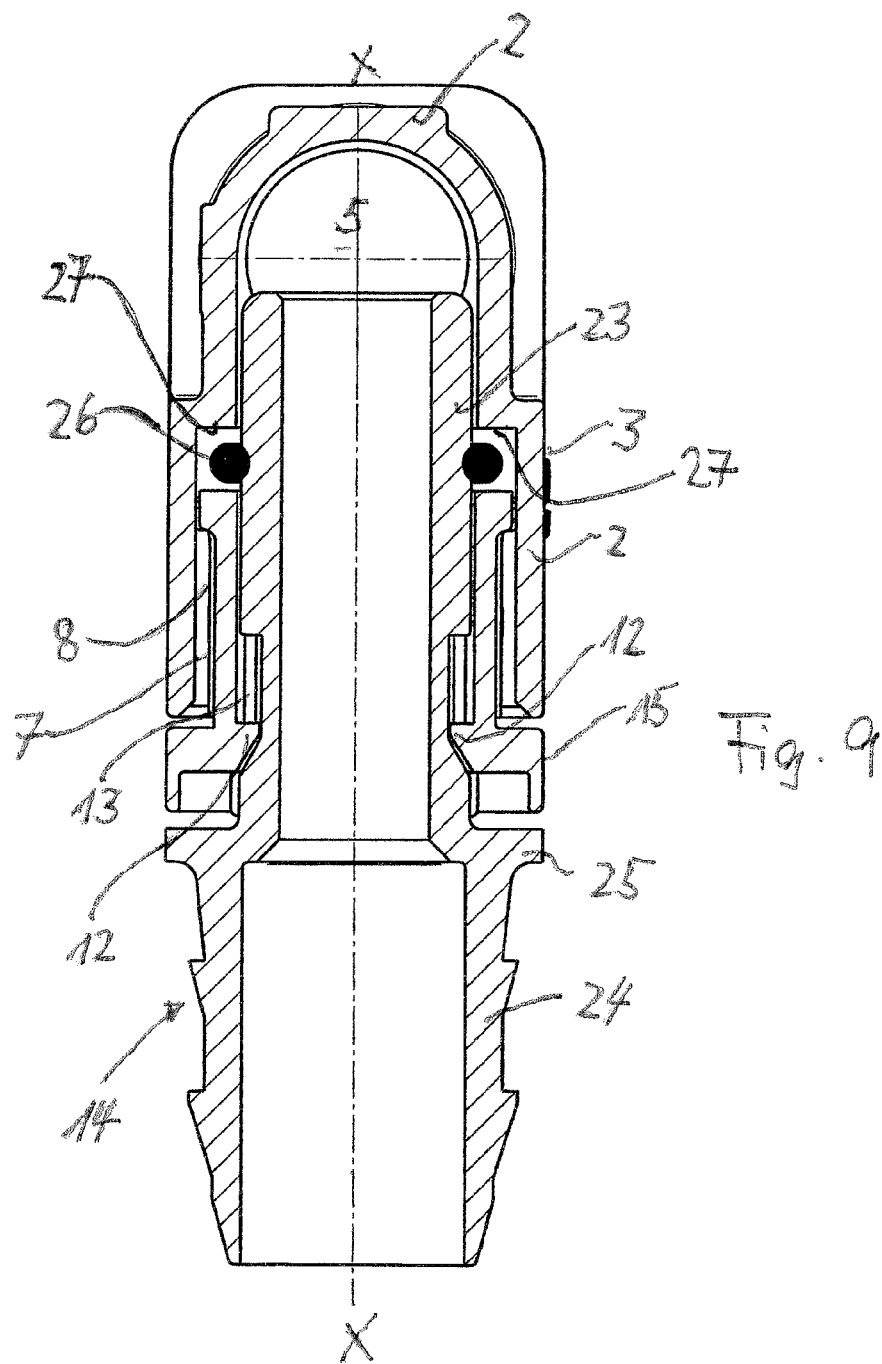
Figure 10:
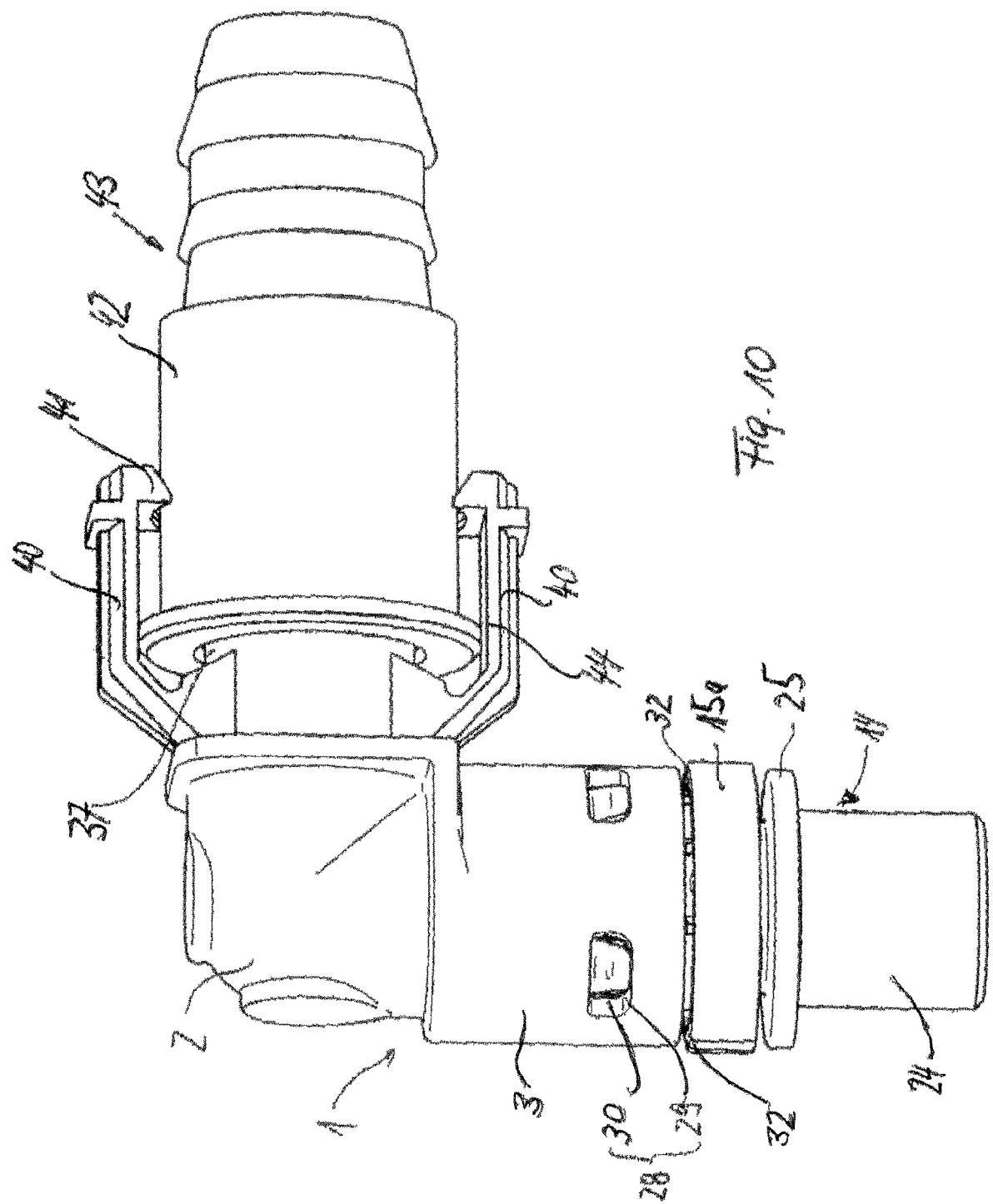

As shown in FIG. 9, it can be useful if the mating connector 14 has a locking groove 35 that has an axial length such that an axial displacement of the plug shank 23 in and against the direction of insertion Z can take place in the plugged-in state of the mating connector 14. This also requires that the length of the plug shank 23 between the locking groove 35 and its free end is dimensioned such that in any position of the plug shank 23 in the adapter sleeve 7, extensive sealing is guaranteed by means of the circumferential seal 26 arranged in the sleeve section 3. This means that the plug shank 23 is extended by the length of the locking groove 35 measured from its rear contact surface seen in the direction of insertion Z, i.e. the contact surface adjacent to the free end. By means of this design, a tolerance compensation is possible in the connector 1, where, for example, a compensating length of 5 mm is appropriate.

Figure 12:
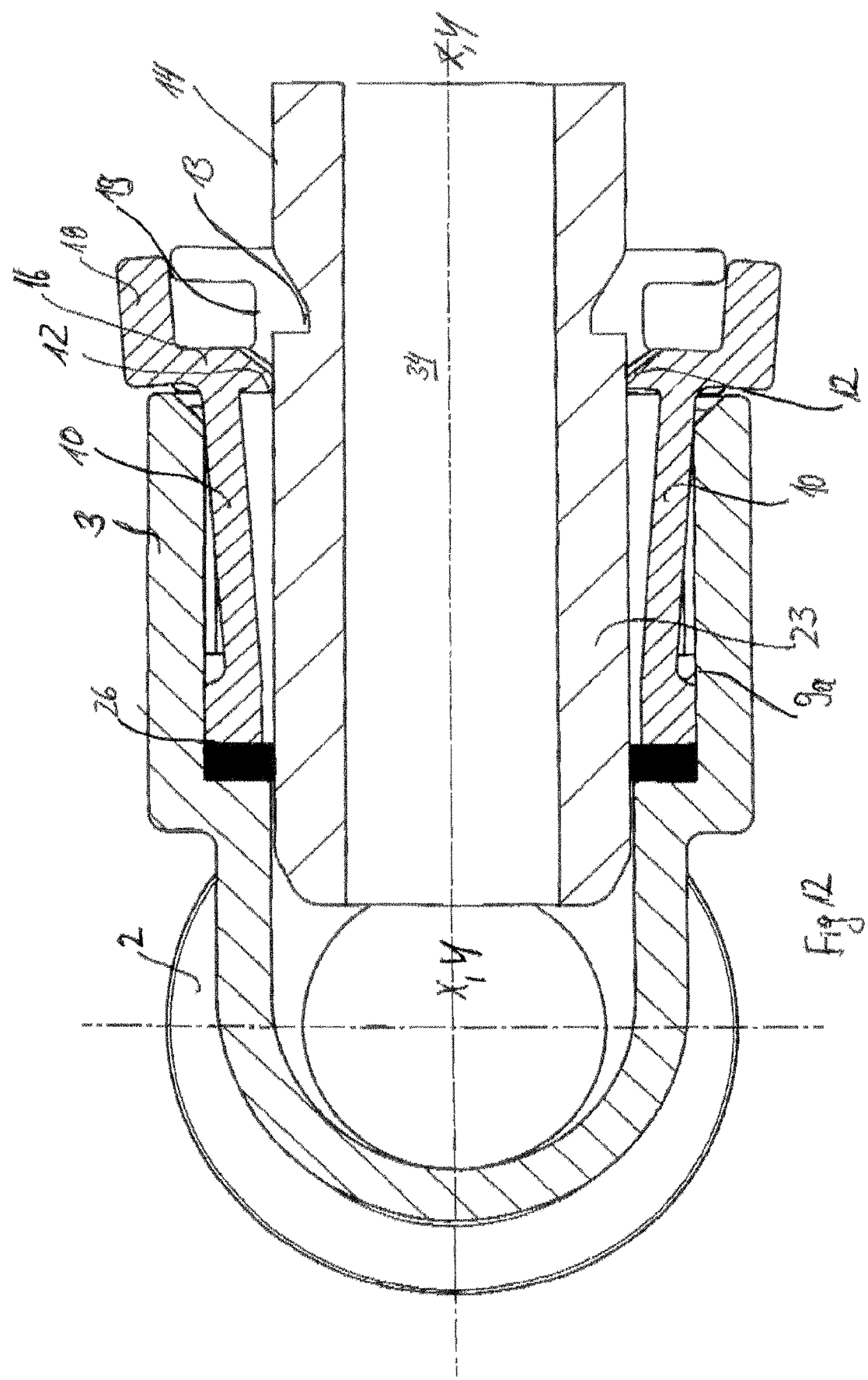
FIG. 12.

In FIG. 12 an inventive connector 1 according to the FIGS. 1 to 4 is shown in an advantageous execution wherein the mating connector 14 is not yet completely inserted into the connector 1, so that the locking cams 12 are not yet engaged in the locking groove 13. Here it can be seen that the plug shank 23 of the mating connector 14 has spread the spring arms 10 radially outward in relation to the longitudinal central axis X-X or Y-Y, so that the angled extensions 18 opposite the circumference of the sleeve section 3 project in radial direction. In this way, there is a visual capability to monitor whether the mating connector 14 is inserted completely to its engaged position of the locking cams 12 in the locking groove 13. For in the engaged position, the angled extensions 18 terminate flush with the outer circumference of the sleeve section 3, so that no radial protrusion results.

Figure 13:
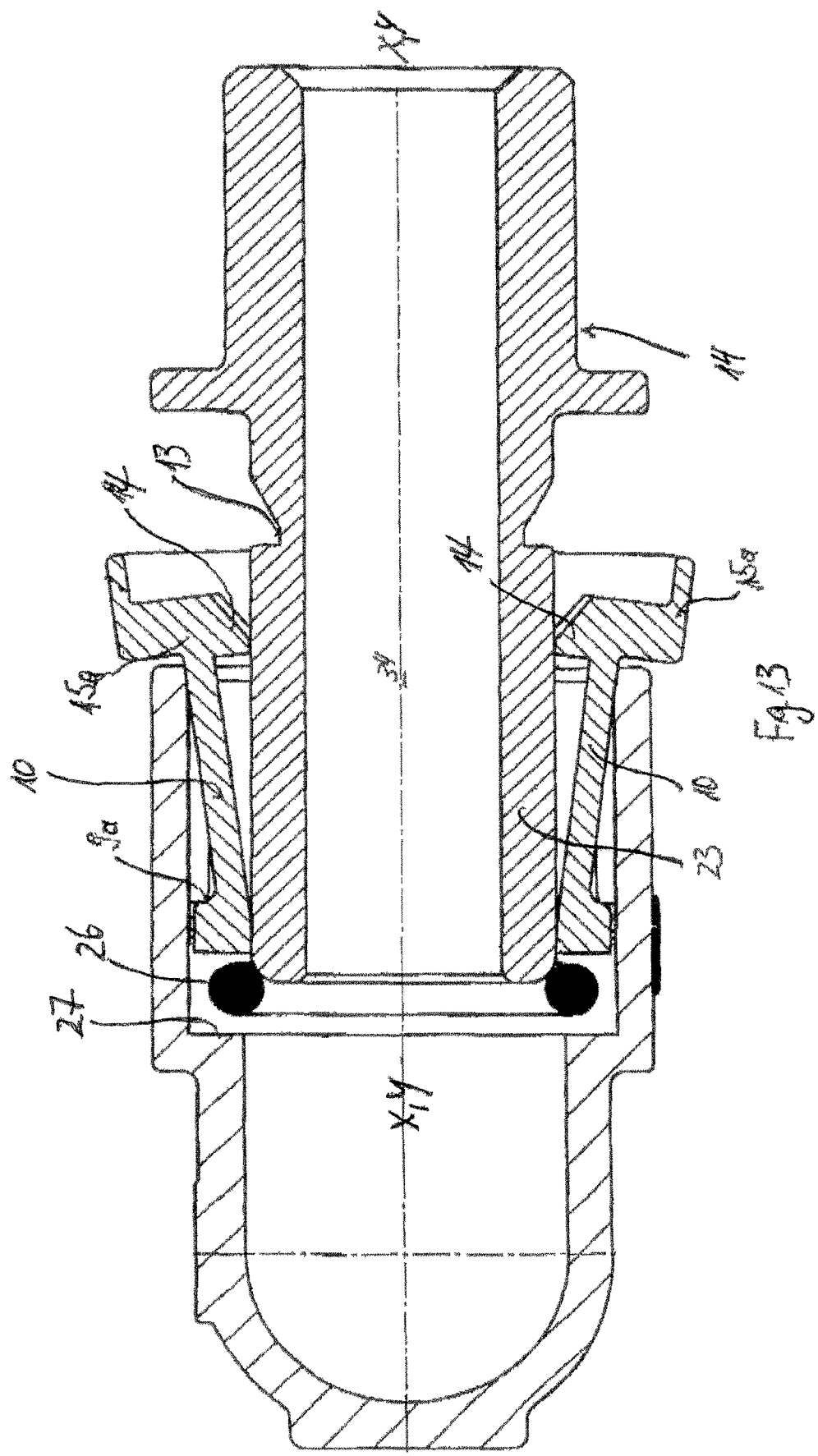
FIG. 13 longitudinal section through an inventive connector and a mating connector that is not fully inserted corresponding to the embodiments according to FIG. 1 and FIG. 5, FIG. 14 a section according to FIG. 8 through an additional embodiment of an inventive connector, FIG. 14a an enlargement as a detail view of a section B in FIG. 14, FIG. 15 an exploded representation of an additional embodiment of an inventive connector, FIG. 16 a section through a connector according to FIG. 15 in an inserted state of the mating connector, FIG. 17 a perspective representation of an adapter sleeve according to FIG. 15, FIG. 18 a view of the adapter sleeve according to FIG. 17 in the direction of the arrow XVIII and FIG. 19 a view of the adapter sleeve according to FIG. 17 corresponding to the arrow XIX in FIG. 17.

In FIG. 13 the insertion situation corresponds to that in FIG. 12 for a connector 1 according to the FIGS. 5 to 8 in a preferred embodiment. Here the annular collar 15*a* projects radially outward with its sections connected to the latching arms 10 when the mating connector 15 is not yet completely inserted, so that in this way, once again, there is visual monitoring of whether or not the engaged position has been reached. Because in the engaged position, the annular collar 15*a* terminates with its outer circumference circumferentially flush with the outer circumference of the sleeve section 3.

In the FIGS. 12 and 13, it can be seen how the radial height of the stepped surface 9*a* and the length of the locking arms 10 within the sleeve section 3 are decisive for the outwardly directed spring path of the locking cams 12 so that the radial distance of the radially outwardly spread locking cams is greater/equal to an inner diameter of the adapter sleeve and/or greater than the outer diameter of the plug shank 23 of the mating connector 14.

Figure 11:
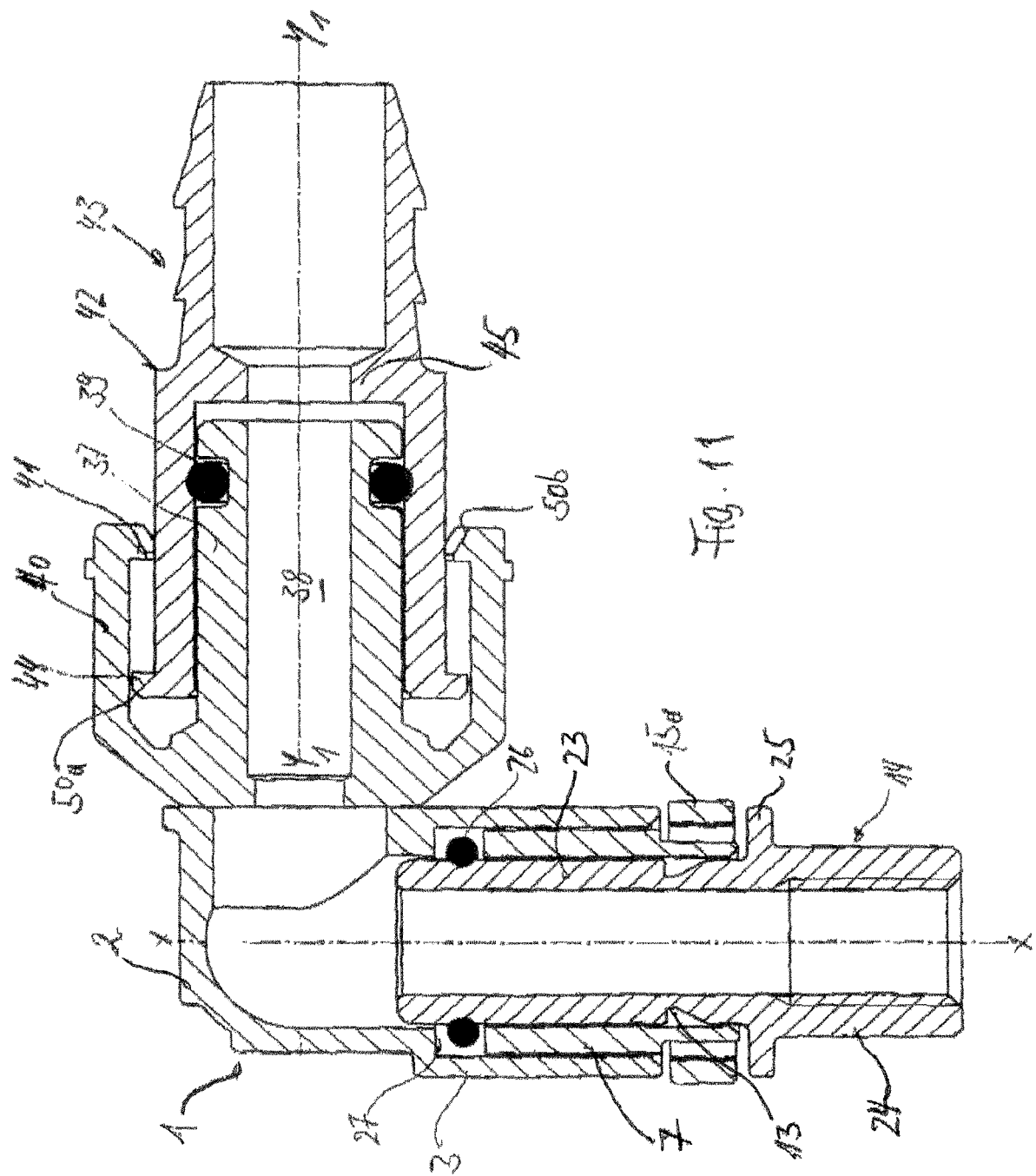

In other respects, parts similar to those shown in the FIGS. 1 to 10 are provided with the same reference numbers, so that the connector 1 shown in FIG. 11 and the mating connector 14 can be formed according to the embodiments in the FIGS. 1 to 10.

According to the invention, the plug-in section 4 of the connector 1 opposite the sleeve section 3 can be formed as a sleeve for inserting or threading in a line connection or, for example, as a plug-type spigot, see FIG. 1.

In addition, the invention also relates to a connector 1, with which the plug-in section 4 opposite the sleeve section 3 is formed as a connecting pin 37, see FIG. 11. This connecting pin 37 has a circular cross-section in relation to its longitudinal central axis $Y_1$-$Y_2$ and has an inner fluid channel 38. This fluid channel 38, with a plug-in connector 1 according to the FIGS. 1 to 11—as also depicted in the FIGS. 12 and 13—transitions into the through-channel 5 of the housing 2. In the region of its free end, the connecting pin 37 has a circumferential seal 39, in particular an O-ring seal arranged in a circumferential groove. In the region opposite the free end of the connecting pin 37, there is a plurality of latching webs 40 extending in the direction of the free end, running parallel to the longitudinal central axis $Y1$-$Y_2$ which are spaced apart at regular intervals on the circumference of the connecting pin 37. There are preferably two diametrically opposite latching webs 40. At their free ends, the latching webs 40 point radially in relation to the longitudinal central axis $Y_1$-$Y_2$ toward inwardly directed catch projections 41. A guide slot is formed between the latching webs 40 and the connecting pin 37. On the connecting pin 37, in the guide slot formed between the latching webs 40 and the connecting pin 37, a connecting sleeve 42 is slid onto the connecting pin 37, which is part of a terminal connector 43 for a fluid connection, for example a fluid line. This connecting sleeve 42 has an inner through-bore which is adapted with its inner diameter to the outer diameter of the connecting pin 37 so that a circumferential gap is present, which is sealed by the circumferential seal 39. In addition, the circumferential seal 39, due to its deforming tension, attaches the connecting sleeve 42 on the connecting pin 37.

At the free end, the connecting sleeve 42, on its outer circumference, has an annular shoulder 44 projecting radially outward in relation to the longitudinal central axis $Y_1$-$Y_1$. This annular shoulder 44 and the catch projections 41 have corresponding approach ramps 50*a*, 50*b*, so that when the connecting sleeve 42 is slid on, the latching webs 40 are spread radially outward. The catch projections 41 and the annular shoulder 44 are dimensioned such in relation to one another that the catch projections 41 are an axial stop for the annular shoulder 44. To this end, both parts have stop surfaces 50*a*, 50*b* facing one another extending vertically to the longitudinal central axis $Y_1$-$Y_2$. This inventive configuration of the connecting pin 37 and the connecting sleeve 42 allows an axial displacement of these parts to relative to one another in a connected state. In this regard, the axial displacement path is determined by the length of the latching webs 40 up to the catch projections 41. In this regard, for example, there can be a displacement path of 20 mm and a maximum of 50 to 60 mm, so that there is corresponding length compensation. In consequence, the crash safety of an inventive connector 1 or terminal connector 36 is substantially increased. A connecting pin or a connecting sleeve for attaching a fluid connection can be formed on the end of the terminal connector 36 opposite the connecting sleeve 42. A circular depth stop 45 for the connecting pin 37 can be formed inside the terminal conductor 36.

Furthermore, the invention relates to a plug-in coupling from the connector in FIGS. 1 to 4, 9, 10, 11, or FIGS. 5 to 8, 9, 10, 11, with the mating connector according to the FIG. 1, 9 or 5, 9.

An additional embodiment of an inventive connector is shown in the FIGS. 15 to 19.

Here, as in the previous figures, parts with the same functions are provided with the same reference numbers.

The adapter sleeve 7 has a sleeve wall 9 surrounding the through-opening 8. In the sleeve wall 9, locking means are formed in two diametrically opposite sections. These locking means consist of two latching arms 10 that are offset by 180° to one another and that are radially elastic in relation to a longitudinal central axis X-X of the adapter sleeve 7. These latching arms 10 extend parallel to the longitudinal central axis X-X and are separated from the sleeve wall 9 on their longitudinal sides by slot-shaped cutouts. On the front end of the adapter sleeve in the direction of insertion Z the latching arms 10 are attached to the sleeve wall 9. Here the latching arms 10 have a smaller thickness than the wall-thickness of the sleeve wall 9 so that between the outer circumference of the sleeve wall 9 and the latching arm 10, a stepped surface 9a is formed in the direction of the longitudinal central axis X-X.

Figure 15:
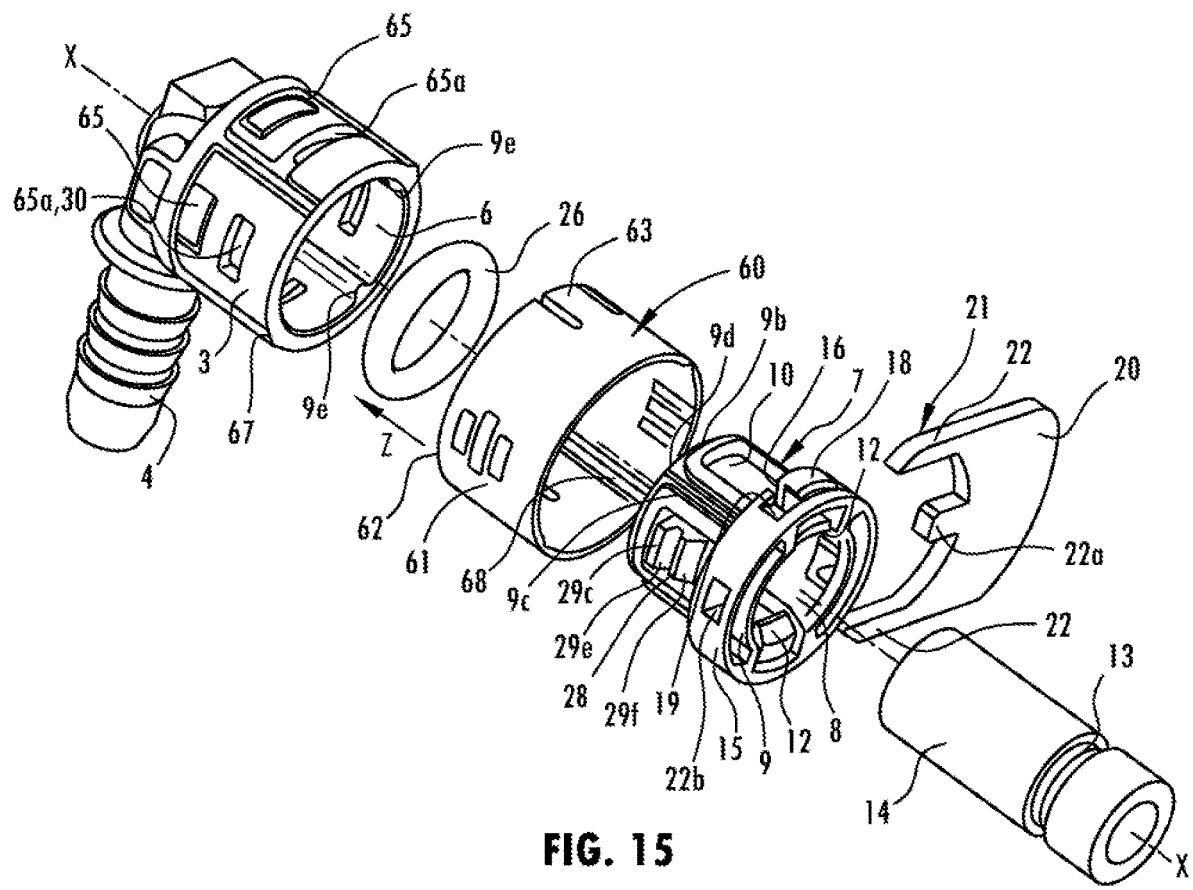
Figure 16:
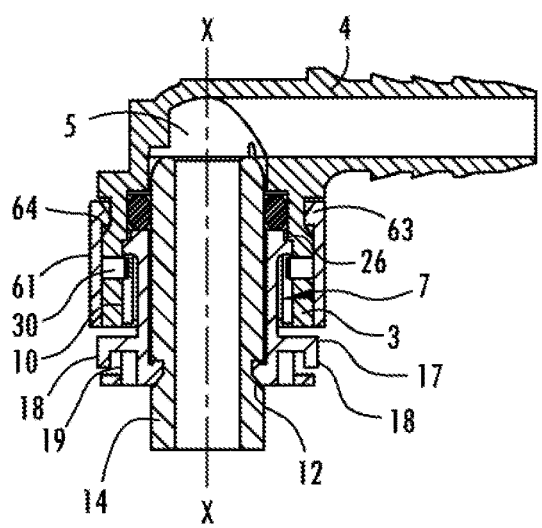

With the embodiment according to FIG. 15, the latching arms 10, at their free ends, have locking cams 12 aligned in the direction of the longitudinal central axis X-X. These locking cams 12 engage in the through-opening 8 state of the adapter sleeve 7 in a latching groove 13 of a plugged in or connected mating connector 14, see FIGS. 15, 16. In the inserted state of the adapter sleeve 7 in the sleeve section 3, these locking cams 12 lie outside the sleeve section 3. As shown in FIG. 16, the through-opening 8 has the same inner diameter across its entire length, so that there is a continuous non-stepped inner wall. This transitions in particular into an inclined insertion surface in the opening region of the through-opening 8 in the rearward opening region in the direction of insertion Z.

Figure 17:
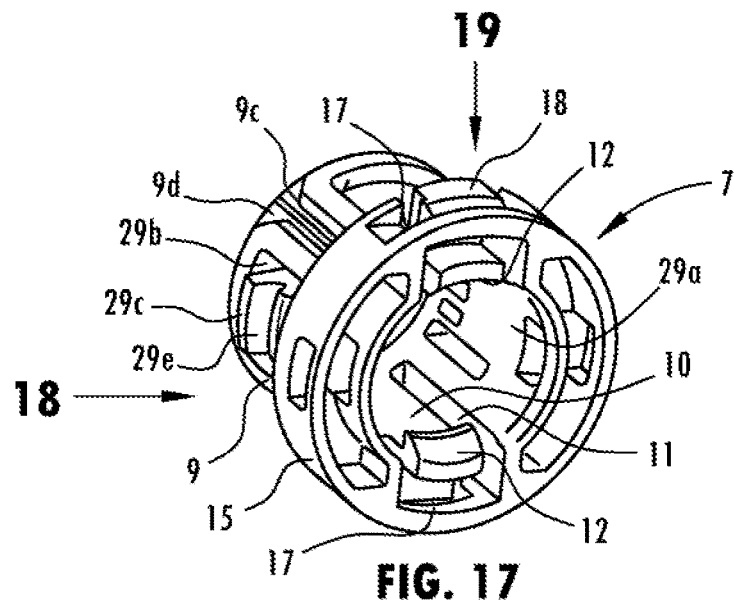
Figure 18:
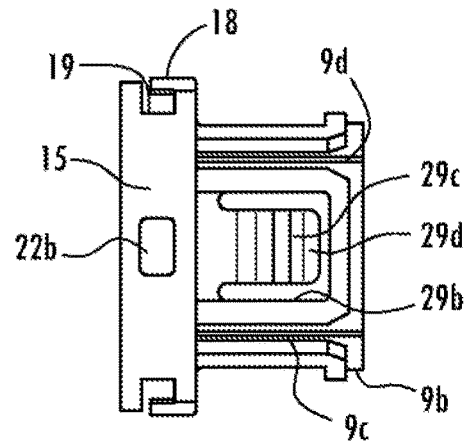
Figure 19:
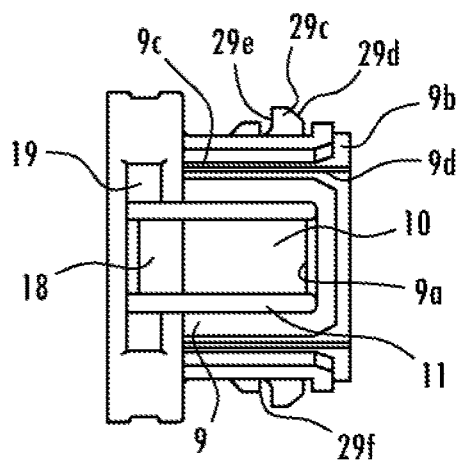

It is advantageous if the adapter sleeve 7 has an annular collar 15 on the circumference of its through-opening 8, i.e. in the rearward opening region seen in the direction of insertion Z. This annular collar 15 extends radially offset outward, opposite the sleeve wall 9, so that its outer diameter and its inner diameter are, in particular, greater than the outer diameter of the sleeve wall 9. Advantageously, the outer diameter of the annular collar 15 is equal to that of the sleeve section 3; as can be seen in FIG. 17, it can be useful if an annular step 9b is formed on the front end, in the direction of insertion Z, of the adapter sleeve 7 by means of a reduction in diameter. Starting from this annular step 9b, guide grooves 9c running parallel to the longitudinal central axis X-X extend on the circumference of the adapter sleeve 7, the groove bottom of said guide grooves 9c lying on the same radius around the longitudinal central axis X-X as the circumference of the annular step 9b. Each of the guide grooves 9c has an insertion opening 9d that widens inward in the shape of a funnel in the direction of insertion Z. The guide grooves 9c serve to guide guide-ribs 9e formed in the interior of the channel section 6 on its inner wall during insertion of the adapter sleeve 7 into the channel-section 6, the adapter sleeve 7 then being aligned such that the guide ribs 9e are guided into the guide grooves 9c. This results in a correct positioning of the adapter sleeve 7 in the channel section 6.

In the embodiment shown, the adapter sleeve 7 is attached in a positive-locking manner in axial and preferably also in circumferential direction inside the sleeve section 3 by means of positive-locking elements. These positive-locking elements comprise radially-elastic locking means formed on the circumference of the adapter sleeve 7 between the latching arms 9, 10. These locking means are formed, in particular, by two radially-elastic, flexible arms 29a that extend axially parallel to the longitudinal central axis X-X. These arms 29a, in particular offset by 90° from one another, are respectively assigned to the latching arms 10. The arms 29a are separated from the wall of the adapter sleeve 7 by a U-shaped slot 29b and are integrally connected with the wall of the adapter sleeve 7 with their ends pointing against the direction of insertion Z, see FIG. 17. At their free ends, the arms 29a have latching cams 29c that project radially outward, and which have an oblique surface 29d pointing in the direction of insertion Z, as well as a latching surface 29e extending vertically to the longitudinal central axis XX, said latching surface forming, at its outer free end, an acute angle with the oblique surface 29d. A circumferential circle on which the latching cams 29c lie with their free ends, has a diameter that is greater than the inner diameter of the channel-section 6 of the sleeve section 3, and smaller than the outer diameter of the channel section 6. It is advantageous if a stiffening section 29f is formed behind the respective latching arm 10 seen in the direction of insertion Z. The thickness of the arm 29 is preferably smaller than the thickness of the wall of the adapter sleeve 7. The spring elasticity of the arms 29a can be adjusted via the length and the thickness of the arms 29a.

The latching cams 29c correspond with the recesses 30 in the circumferential wall of the sleeve section 3 such that in the inserted state of the adapter sleeve 7 in the sleeve section 3, the latching cams 29c engage in a positive-locking manner in the recesses 30. The recesses 30 are advantageously formed as apertures in the wall of the sleeve section 3. Preferably there are four apertures 30 arranged offset by 90° to one another in the sleeve section 3. The latching cams 29c are in particular dimensioned such that their free ends, in the engaged state, do not project out of the apertures 30. In that four apertures 30 are formed offset by 90° to one another, the adapter sleeve 7 can be inserted in positions that are rotated by 90° relative to one another. It is also within in the scope of the invention if the apertures 30 are formed as inner recesses, so that the circumferential wall of the sleeve section 3 is closed.

The latching cams 29c engage with their latching surfaces 29e, which extend vertically to the longitudinal central axis X-X, and the apertures 30 have latching surfaces 29e opposite the latching surfaces 29e, said contact surfaces also extending vertically to the longitudinal central axis. In the inserted state, this design of the opposite surfaces results, in the engaged state, in a positive connection in the axial direction. Advantageously, the latching cams 29c and the recesses 30 are adapted to one another such that in the engaged state, a rotation of the adapter sleeve 7 is not possible.

Radially outwardly projecting, web-like actuating extensions 16 are formed on the latching arms 10 at their free ends in relation to the longitudinal central axis X-X. These actuating extensions 16 extend through radially extending cutouts 17, to be precise in relation to the longitudinal central axis X-X, so that the annular collar 15 is interrupted by these cutouts 17. At their free ends, the actuating extensions 16 have extensions 18 angled against the direction of insertion Z, said extensions extending parallel to the longitudinal central axis X-X. These extensions 18 advantageously extend flush with the outer circumference of the annular collar 15 so that the radial distance of the angled extensions 18 to the longitudinal central axis X-X on their outer surface, i.e. the outer diameter of the extensions 18, is equal to the outer diameter of the annular collar 15. In the region of the extensions 18 there are guide grooves or cutouts 19, in the annular collar 15 tangential to the through-opening 8 of the adapter sleeve 7, said cutouts being U-shaped in cross-section and open-edged radially outwards such that they extend in a secant-like manner. The extensions 18 and the guide grooves or guide cutouts 19, form an insertion opening for a release tool 20. This release tool 20 has, for example, a fork-shaped end-section 21 with two diametrically opposite fork prongs 22. The distance between the fork prongs corresponds to the radial distance between the guide grooves 19 in the region of their bottom sections. The width of the fork prongs 22 is smaller/equal to the width of the guide grooves 19. The fork prongs 22 have, at their free ends, a height that is smaller than the radial distance between the angled extensions 18 and the bottom section of the guide grooves 19. Starting from their free end, the height of the fork prongs 22 continually increases up to a final height dimension. This final height dimension is such that by inserting the fork prongs 22 vertically to the longitudinal central axis X-X into the plug-through openings formed by the extensions 18 and the guide grooves 19, the latching arms 10 are elastically bent radially outward, to be precise such that the radial distance between their locking cams 12 is greater than the outer diameter of a plug shank 23 of the mating connector 14. If the plug shank 23, in the inserted state of the mating connector 14, is inside the adapter sleeve 7 with the locking cams 12 engaged in the locking groove 13 of the mating connector 14, the engaged position of the locking cam 12 can be released by inserting the release tool 20 into the guide grooves 19, and the plug shank 23 can be pulled out of the adapter sleeve 7. Between the fork prongs 22 the release tool 20 advantageously has a guide web 22a extending parallel to the fork prongs 22, which in the inserted state of the release tool 20 is guided in a recess 22b in the annular collar 15 such that a tilting of the release tool 20 is prevented. Preferably, two recesses 22b opposite to one another are provided in the annular collar.

As shown in FIGS. 15, 16, it can be advantageous if at the outer circumference of the sleeve section a release lock 60 is slideably arranged in longitudinal direction of the longitudinal central axis X-X. This release lock 60 is displaceably mounted between two positions, in particular locking positions. The first position is an assembly position, in which the mating connector 40 can be or is inserted into the inventive connector, to be precise in the adapter sleeve 7, see FIG. 16. The second position is a position in which the release lock 60 is slid in the direction of the annular collar 15 such that the release lock 60 prevents a radical spreading of the latching arms 10.

Advantageously, according to the advantageous embodiment of the release lock 60 shown, the release lock 60 comprises a sleeve 61 that surrounds the sleeve section 3 in a positive-locking manner. This sleeve 61 is slideably mounted on the sleeve section 3, to be specific between the previously described two positions. In the first position, the sleeve 61 is completely on the sleeve section 3, see FIG. 16, so that the annular collar 15 is feely accessible and a spreading of the latching arms 10 by means of the release tool 20 is possible, so that the latching arms 10 can be radially spread when the mating connector 14 is inserted. In this position, the sleeve 61 engages in a force-fitting manner, for example by means of latching tongues 63 formed on its circumference 62, with end-side catch projections 64, i.e. releasably in a recess or on a step 65 in the circumferential wall of the sleeve section 3. The displacement force of the sleeve 61 against the direction of insertion Z is greater than the insertion force of the mating connector 14 into the adapter sleeve 7. Advantageously there are two latching tongues 63 offset to one other by 180° and two recesses 65 or two steps 65, offset by 90°. In the second position, which is also a releasable latching position, the sleeve 61 also surrounds the annular collar 15. In this way, a spreading of the latching arms 10 is no longer possible, so that in this way, an unintentional release of the inventive plug-in connection is prevented in the plugged-in state of the mating connector 14. In this second locking position, the sleeve 61 engages in a force-fitting manner, i.e. releasably, by means of its latching tongues 63 in the circumferential wall of the sleeve section 3 in the recesses 65a present there, which might coincide with the recesses 30.

Advantageously formed on the outer circumference of the sleeve section 3 are four longitudinal ribs 67 arranged offset by 90° to one another. In adaptation to this, the sleeve 61 has guide grooves 68 in its sleeve wall to receive the longitudinal ribs 67. This enables correct positioning when plugging the sleeve 61 onto the sleeve section 3 if the adapter sleeve 7 is not yet inserted into the sleeve section 3.

The invention is not limited to the presented and described embodiments but rather includes all embodiments that operate identically in the sense of the invention. It is stressed that the embodiments are not limited to all features in combination, but rather that each individual sub-feature, even in isolation from all other sub-features, can as such have inventive significance. In addition, to date, the invention has not been limited to a specific combination of features defined defined herein, but can also be defined by any other combination of specific features, or all disclosed individual features. This means that in principle, virtually every individual feature can be omitted or replaced by at least one individual feature disclosed in another place in the application.

The invention claimed is:

1. A connector for connecting at least one fluid line with another fluid line or to a unit connection, the connector comprising a housing, a mating connector and an adapter sleeve, the housing defining a through-channel and having an end formed as a sleeve section into which the mating connector and adapter sleeve are received, the adapter sleeve configured to releasably attach the mating connector to the housing, the adapter sleeve being held in the sleeve section by positive-locking elements, the adapter sleeve including a sleeve wall having a front end in a direction of insertion (Z) of the adapter sleeve into the sleeve section and a rear end in a direction opposite of the direction of insertion (Z), the sleeve wall surrounding a constant diameter through-opening in which a plug shank of the mating connector is received, a latching mechanism formed in the sleeve wall and having at least two latching arms that are radially elastic in relation to a longitudinal central axis of the adapter sleeve, the latching arms extending parallel to the longitudinal central axis and being formed on the circumference of the adapter sleeve by cutout slots in the sleeve wall between the front end and rear ends, the latching arms being attached to the sleeve wall at the front end of the adapter sleeve and extending from the front end toward the rear end and terminating at free ends thereof, the free ends having first locking cams extending radially towards the longitudinal central axis, in the inserted state of the plug shank of the mating connector the first locking cams of the latching arms being engaged in a locking groove formed on the plug shank and being axially located outside of the sleeve section of the housing, the positive-locking elements are formed as radially elastically flexible arms having a portion extending parallel to the longitudinal central axis (X-X), the flexible arms being diametrically opposite to one another and offset by 90° relative to the latching arms, the flexible arms having on free ends extending in the direction of insertion (Z) second locking cams that project radially outward, the flexible arms are separated by a U-shaped slot from the sleeve wall of the adapter sleeve and are integrally connected with the sleeve wall of the adapter sleeve at the rear end thereof pointing against the direction of insertion.

2. The connector according to claim 1, wherein the second locking cams include an oblique surface facing in the direction of insertion (Z) and a latching surface extending perpendicular to the longitudinal central axis that facing in a direction against the direction of insertion.

3. The connector according to claim 1, wherein the second locking cams circumferentially define a circle having a diameter that is smaller than an outer diameter of the sleeve section and larger than the inner diameter of the sleeve section.

4. The connector according to claim 1, wherein the latching arms have a radial thickness that is smaller than the wall thickness of the adapter sleeve, so that a stepped surface extending radially in the direction of the longitudinal central axis is formed between the outer circumference of the wall of the adapter sleeve and the latching arms.

5. The connector according to claim 4, wherein a radial height of the stepped surface and a length of the latching arms within the sleeve section are dimensioned such that a radially outwardly directed spring path is present in such manner that when spread radially outwardly a radial distance to the longitudinal central axis from the locking cams is at least equal to an inner radius of the through-opening of the adapter sleeve and at least equal to an outer radius of the plug shank of the mating connector.

6. The connector according to claim 1, wherein the positive-locking elements are attached in recesses in a positive-locking manner in the circumferential direction of the adapter sleeve, whereby the recesses include four recesses offset by 90° relation to one another.

7. The connector according to claim 1, wherein the adapter sleeve has an annular collar circumferentially extending on a rear opening-edge seen in the direction of insertion (Z), with the first end of the adapter sleeve fully inserted into the sleeve section the annular collar and the first locking cams being positioned outside of the sleeve section.

8. The connector according to claim 7, wherein the annular collar is configured as circumferentially circular and has an outer diameter smaller than or equal to an outer diameter of a circular circumferential contour of the sleeve section or an outer diameter of the sleeve section.

9. The connector according to claim 7, wherein in the region of the actuating extensions, open-edged guide grooves or apertures are formed on the annular collar, the guide grooves or apertures resulting in the annular collar being interrupted by the actuating extensions, the actuating extensions each having an extension projecting against the direction of insertion and extending parallel to the longitudinal central axis outside a respective one of the guide groove or aperture so that a plug-through opening is formed for inserting of a release tool between the extensions and the guide grooves.

10. The connector according to claim 9, wherein radial outer surfaces of the extensions define a diameter equal to an outer diameter of the annular collar.

11. The connector according to claim 10, wherein an outer diameter of the annular collar in a region adjacent to the first locking cams is equal to an outer diameter of the sleeve section.

12. The connector according to claim 7, wherein the annular collar is separated from the adapter sleeve by circumferential gap sections between the latching arms and surrounds the latching arms in a region of the first locking cams and is connected to the latching arms in this region, and the annular collar including deformation sections centrally between the latching arms and configured to be deformed under a force directed radially toward the longitudinal central axis thereby producing a radially outwardly directed spreading of the latching arms such that the first locking cams enter a release position relative to the mating connector.

13. The connector according to claim 7, wherein a release lock is provided on an outer circumference of the sleeve section and displaceable in the longitudinal direction between first and second positions, the release lock, when in the second position being configured to prevent a spreading of the latching arms and when in the first position being configured to not prevent spreading of the latching arms.

14. The connector according to claim 13, wherein the release lock is a sleeve surrounding the sleeve section, the sleeve having, on its circumferential edge, latching tongues extending in the direction of insertion that are engaged in recesses defined in a circumferential wall of the sleeve section when in the second position.

15. The connector according to claim 14, wherein the sleeve in its second position surrounds the annular collar and the extensions.

16. The connector according to claim 1, wherein the latching arms are offset relative to one another by 180° and that actuating extensions are provided on the free ends of the latching arms, the actuating extensions projecting radially outward in relation to the longitudinal central axis.

17. The connector according to claim 1, wherein the latching arms have a radial thickness smaller than the wall thickness of the adapter sleeve and define a stepped surface extending in the direction perpendicular to the longitudinal central axis and formed between an outer circumference of the wall of the adapter sleeve and the latching arms.

18. The connector according to claim 17, wherein a radial height of the stepped surface and a length of the latching arms located within the sleeve section is dimensioned such that a radially outwardly directed spring path of the first locking cams is produced such that a radial spacing of the locking cams when radially spread outwardly is greater than or equal to an inner diameter of the adapter sleeve and/or greater than an outer diameter of the plug shaft of a mating connector.

19. The connector according to claim 1, wherein a circumferential seal for sealing a circumferential gap between an inner wall of the sleeve section and the plug shank of the mating connector is positioned in the through-opening of the sleeve section in front of the adapter sleeve.

20. The connector according to claim 1, wherein the sleeve section includes an annular shoulder at a transition of increased diameter from the through-channel, the annular shoulder defining an abutment for a circumferential seal, and the circumferential seal is crimped between the annular shoulder and a front end face of the adapter sleeve.

21. The connector according to claim 1, wherein the housing has on an end opposite of the sleeve section a connecting pin with a circumferential seal at its free end, and on which are arranged, in a region of the connecting pin opposite the free end, a plurality of latching webs extend parallel to the longitudinal central axis and in the direction of the free end, the latching webs having at ends thereof catch projections directed radially inward in relation to a longitudinal central axis of the connecting pin.

22. The connector according to claim 21, wherein between the latching webs and the connecting pin, a guide gap is formed, into which is received a connecting sleeve, the connecting sleeve having a through-bore receiving the connecting pin, the connecting sleeve having an annular shoulder that projects outward in relation to the longitudinal central axis of the connecting pin, the annular shoulder being slideable in the guide groove between the catch projections and an opposite end of the latching webs.

23. The connector according to claim 1, wherein in the direction of insertion at a front end of the adapter sleeve an annular step is formed by a reduction in diameter of the adapter sleeve, extending on an outer surface of the adapter sleeve from the annular step are guide grooves parallel to the longitudinal central axis, a groove bottom of the guide grooves lying on a same radius as a circumference of the annular step, the guide grooves receiving guide ribs formed on an inner wall of the sleeve section.

24. The connector according to claim 23, wherein the annular step of the adapter sleeve has a circumferential contact surface extending radially to the longitudinal central axis, the sleeve section having a corresponding ring-shaped stop surface formed at a diameter-widening of the through-channel, wherein in an inserted state of the adapter sleeve, the adapter sleeve abuts the contact surface with the stop surface.

25. The connector assembly according to claim 1, where the mating connector includes a locking groove formed behind the plug shank in the direction of insertion (Z), wherein the plug shank is dimensioned such that in the inserted state, its free end projects out of the adapter sleeve and terminates in the through-channel of the housing and its outer diameter is greater than the radial distance between the locking cams in a non-spread state.

26. The connector according to claim 25, wherein the locking groove is arranged and formed such that in the inserted state of the plug shank the first locking cams of the latching arms engage in the locking groove in a positive-locking manner.

27. The connector according to claim 25, wherein the locking groove has an axial extent in the direction of the direction of insertion such that in the inserted state in the adapter sleeve, an axial displacement of the plug shank according to a certain displacement path is given, the length of the plug shank between the locking groove and its free end being dimensioned such that the plug shank is extended by the length of the axial displacement path.

* * * * *